United States Patent
Niessner et al.

(10) Patent No.: US 11,545,816 B2
(45) Date of Patent: Jan. 3, 2023

(54) SPARK PLUG WITH MULTIPLE SPARK GAPS

(71) Applicant: FEDERAL-MOGUL IGNITION GMBH, Neuhaus-Schierschnitz (DE)

(72) Inventors: Werner Niessner, Steinheim (DE); Michael Golin, Dexter, MI (US)

(73) Assignee: FEDERAL-MOGUL IGNITION GMBH, Neuhaus-Schierschni (DE)

(*) Notice: Subject to any disclaimer, the term of this patent is extended or adjusted under 35 U.S.C. 154(b) by 0 days.

(21) Appl. No.: 17/507,487

(22) Filed: Oct. 21, 2021

(65) Prior Publication Data

US 2022/0140576 A1 May 5, 2022

Related U.S. Application Data

(60) Provisional application No. 63/109,440, filed on Nov. 4, 2020.

(51) Int. Cl.
| | |
|---|---|
| *H01T 13/22* | (2006.01) |
| *H01T 13/54* | (2006.01) |
| *H01T 13/46* | (2006.01) |
| *H01T 13/08* | (2006.01) |

(52) U.S. Cl.
CPC .......... *H01T 13/467* (2013.01); *H01T 13/08* (2013.01); *H01T 13/22* (2013.01); *H01T 13/54* (2013.01)

(58) Field of Classification Search
CPC .................. H01T 13/22; H01T 13/54
USPC ........................................... 315/246
See application file for complete search history.

(56) References Cited

U.S. PATENT DOCUMENTS

| | | | |
|---|---|---|---|
| 4,275,328 A | 6/1981 | Watanabe et al. | |
| 4,308,487 A | 12/1981 | Feaster | |
| 4,489,596 A | 12/1984 | Linder et al. | |
| 4,924,829 A | 5/1990 | Cheng et al. | |
| 5,421,300 A * | 6/1995 | Durling | F02B 19/12 123/266 |
| 5,522,357 A | 6/1996 | Nogi et al. | |
| 5,918,571 A | 7/1999 | Below | |
| 6,094,990 A | 8/2000 | Lykowski et al. | |
| 6,557,508 B2 | 5/2003 | Labarge et al. | |
| 6,843,220 B2 | 1/2005 | Lausch et al. | |

(Continued)

FOREIGN PATENT DOCUMENTS

| | | |
|---|---|---|
| CN | 2705929 Y | 6/2005 |
| DE | 3728161 A1 | 3/1989 |

(Continued)

*Primary Examiner* — Christopher M Raabe
(74) *Attorney, Agent, or Firm* — Reising Ethington, P.C.

(57) ABSTRACT

A spark plug having multiple spark gaps, where at least one of the spark gaps is located within a prechamber. The spark plug may include a first center wire assembly, a second center wire assembly, an insulator, a metallic shell, a first sparking area with a prechamber cap and a ground electrode for a prechamber spark gap, and a second sparking area with a ground electrode for a main chamber spark gap. The spark plug is designed to maximize engine performance and/or operation by utilizing the multiple spark gaps, where the prechamber spark gap may be used for certain operating conditions where such a spark gap is advantageous and the separate main chamber spark gap may be used for other conditions where a main chamber spark gap is advantageous.

20 Claims, 7 Drawing Sheets

(56) References Cited

U.S. PATENT DOCUMENTS

| | | | |
|---|---|---|---|
| 7,007,653 B2 * | 3/2006 | Labarge | H01T 13/50 |
| | | | 123/26 |
| 7,023,127 B2 | 4/2006 | Hiramatsu | |
| 7,282,845 B2 | 10/2007 | Hiramatsu | |
| 7,443,088 B2 | 10/2008 | Lykowski | |
| 7,741,762 B2 | 6/2010 | Alger, II et al. | |
| 7,930,934 B2 | 4/2011 | Winklhofer et al. | |
| 8,857,405 B2 | 10/2014 | Attard | |
| 9,353,674 B2 | 5/2016 | Bunce et al. | |
| 9,441,604 B2 | 9/2016 | Zheng | |
| 9,742,160 B1 | 8/2017 | Minami | |
| 9,828,967 B2 | 11/2017 | Zheng | |
| 10,054,099 B2 | 8/2018 | Zheng | |
| 10,208,651 B2 | 2/2019 | Tozzi et al. | |
| 10,971,902 B2 | 4/2021 | Fuchs et al. | |
| 11,280,278 B2 * | 3/2022 | Leone | F02D 35/021 |
| 2017/0226982 A1 | 8/2017 | Minami | |
| 2018/0135506 A1 | 5/2018 | Grover, Jr. et al. | |
| 2018/0142664 A1 | 5/2018 | Assaad | |

FOREIGN PATENT DOCUMENTS

| | | | |
|---|---|---|---|
| DE | 10329269 A1 | | 1/2005 |
| DE | 102020123248 A1 * | | 3/2022 |
| JP | S5622070 A | | 3/1981 |
| JP | S5675970 A | | 6/1981 |
| JP | 4103817 B2 | | 6/2008 |
| JP | 2011044268 A | | 3/2011 |
| WO | WO2016129504 A1 | | 8/2016 |
| WO | WO2017202482 A1 | | 11/2017 |

\* cited by examiner

SPARK PLUG WITH MULTIPLE SPARK GAPS

RELATED APPLICATIONS

This application claims the priority of U.S. provisional application No. 63/109,440, filed Nov. 4, 2020, the entire contents of which are hereby incorporated by reference.

FIELD

The present disclosure generally relates to spark plugs and other ignition devices for use with various types of engines and, in particular, to spark plugs with multiple spark gaps where at least one of the spark gaps is a prechamber spark gap.

BACKGROUND

Spark plugs are used to ignite air/fuel mixtures in a variety of internal combustion engine types and in a variety of operating conditions. For many engines and/or operating conditions, such as those involving rich air/fuel mixtures, low engine speeds or low load conditions, cold starts, etc., a standard spark gap located in a main combustion chamber of the engine is sufficient for igniting the air/fuel mixture and initiating the combustion process.

However, for other types of engines and/or operating conditions, like those utilizing lean air/fuel mixtures (e.g., mixtures with a Lambda of 1.4 or more), high engine speeds or high load conditions, etc., main chamber spark gaps may not be optimal for igniting the air/fuel mixture. In such cases, a prechamber spark gap may be advantageous for initially igniting the air/fuel mixture and then causing the flame kernel to develop and spread throughout the main combustion chamber. The challenge is to develop a spark plug that can operate well under all such conditions.

One way to address this challenge is to provide a single cylinder with multiple spark plugs: a first spark plug to operate during a first set of operating conditions, and a second spark plug to operate during a second set of operating conditions. However, skilled artisans will appreciate that designing an engine to accommodate multiple spark plugs and then providing such plugs can add additional cost to the engine.

The spark plug disclosed herein is designed to address some of the challenges and drawbacks in the prior art, as noted above.

SUMMARY

According to one embodiment, there is provided a spark plug, comprising: a first center wire assembly; a second center wire assembly; an insulator having a first axial bore for at least partially accommodating the first center wire assembly and a second axial bore for at least partially accommodating the second center wire assembly; a shell having an axial bore for at least partially accommodating the insulator; a first sparking area provided with a prechamber spark gap; and a second sparking area provided with a main chamber spark gap.

In accordance with various embodiments, the spark plug may have any one or more of the following features, either singly or in any technically feasible combination:

the first and second center wire assemblies both extend from a terminal end of the spark plug towards a firing end of the spark plug and are generally parallel to one another and are generally parallel to a central axis of the spark plug;

the first and second center wire assemblies each includes a terminal electrode component, a seal, and a center electrode component, wherein the center electrode component of the first center wire assembly helps form the prechamber spark gap and the center electrode component of the second center wire assembly helps form the main chamber spark gap;

the center electrode component of the first center wire assembly is shorter than the center electrode component of the second center wire assembly so that the prechamber spark gap is located closer to the terminal end than is the main chamber spark gap;

the insulator includes a terminal end section with a terminal end recess that separates first and second terminal end columns;

the insulator includes a central section with a central section solid center that is located along a central axis of the spark plug and separates the first and second axial bores;

the insulator includes a firing end section with a firing end recess that separates first and second insulator nose components;

the first insulator nose component is shorter than the second insulator nose component;

the first insulator nose component is retracted into a first axial bore section of the shell so that a first distal end does not extend beyond an axial end of the shell, and the second insulator nose component extends out of a second axial bore section of the shell so that a second distal end extends beyond an axial end of the shell;

the shell includes a locking section, a threaded section, and a firing end section with an outer support component and an inner support component;

a prechamber cap that is dome-shaped with one or more openings is at least partially attached to the outer support component and the inner support component of the shell to create a prechamber;

a ground electrode is attached to at least one of the outer support component, the inner support component or the prechamber cap, and the ground electrode extends radially towards a center electrode component to form the prechamber spark gap;

the prechamber cap incudes a circumferential flange at an open end, the prechamber cap is welded to the shell with a weldment that passes through the circumferential flange;

a prechamber cap that is disk-shaped with one or more openings is at least partially attached to the outer support component and the inner support component of the shell to create a prechamber;

the inner support component of the shell includes at least one interior shoulder that is located towards a central axis of the spark plug and supports an exterior shoulder of a terminal end component of the insulator;

the inner support component is separate from the rest of the shell and is welded to the shell at the firing end section and/or the threaded section;

the inner support component, the prechamber cap, and at least one ground electrode are first manufactured as a subassembly, and the subassembly is then welded to the shell at the firing end section and/or the threaded section;

the inner support component of the shell is integrally formed with the rest of the shell and connects to the shell at the firing end section and/or threaded section;

the shell includes a main axial bore section, a first axial bore section, and a second axial bore section, the main axial bore section accommodates a central section of the insulator, the first axial bore section accommodates a first insulator nose component, and the second axial bore section accommodates a second insulator nose component;

each of the first and second axial bore sections has a smaller inner diameter than that of the main axial bore section;

the spark plug includes a central axis A, the first axial bore section includes a central axis A', and the second axial bore section includes a central axis A", the central axes A, A' and A" are all parallel to one another and are all offset with respect to one another so that they are not coaxial;

the first axial bore section includes a first interior shoulder for supporting a first exterior shoulder of the first insulator nose component and the second axial bore section includes a second interior shoulder for supporting a second exterior shoulder of the second insulator nose component, the first and second interior shoulders are located at different axial locations along the shell;

further comprising a first sealing element and a second sealing element, the first sealing element is located in the first axial bore section of the shell and is interposed between a first interior shoulder of the first axial bore section and a first exterior shoulder of the first insulator nose component, the second sealing element is located in the second axial bore section of the shell and is interposed between a second interior shoulder of the second axial bore section and a second exterior shoulder of the second insulator nose component;

the first and second sealing elements are combined in a single integrated sealing element;

the first sparking area includes a prechamber cap, a center electrode component, a ground electrode, and a prechamber surrounding the prechamber spark gap, the prechamber is configured to be in communication with a main combustion chamber via one or more openings in the prechamber cap;

the prechamber is defined by a distal end of a first insulator nose component of the insulator, an interior surface of a firing end section of the shell, a surface of an inner support component of the shell, and an inner surface of the prechamber cap;

the prechamber spark gap is an air gap that is formed between the center electrode component and the ground electrode;

the prechamber spark gap is a semi-creeping spark gap that is formed between the center electrode component and the shell and extends along a surface of an insulator nose component;

the second sparking area includes a center electrode component and a ground electrode to form the main chamber spark gap, the main chamber spark gap is configured to be exposed to a main combustion chamber;

the ground electrode is attached to a distal end surface of an outer support component of the shell and extends in both axial and radial directions towards the main chamber spark gap;

the main chamber spark gap is an air gap that is formed between the center electrode component and the ground electrode; and/or the main chamber spark gap is a semi-creeping spark gap that is formed between the center electrode component and the shell and extends along a surface of an insulator nose component;

According to another embodiment, there is provided a spark plug, comprising: a first center wire assembly; a second center wire assembly; an insulator having a first axial bore for at least partially accommodating the first center wire assembly and a second axial bore for at least partially accommodating the second center wire assembly; a shell having an axial bore for at least partially accommodating the insulator; a first sparking area provided with a first spark gap; and a second sparking area provided with a second spark gap, wherein the first spark gap is configured to be advantageous in a first set of operating conditions and the second spark gap is configured to be advantageous in a second set of operating conditions that are different from the first set of operating conditions.

In accordance with various embodiments, the spark plug may have any one or more of the following features, either singly or in any technically feasible combination:

the first spark gap is a prechamber spark gap and the second spark gap is a main chamber spark gap; and/or the first spark gap is a prechamber spark gap and the second spark gap is a prechamber spark gap.

According to another embodiment, there is provided a method of operating a spark plug, the spark plug comprises: a first center wire assembly; a second center wire assembly; an insulator having a first axial bore for at least partially accommodating the first center wire assembly and a second axial bore for at least partially accommodating the second center wire assembly; a shell having an axial bore for at least partially accommodating the insulator; a first sparking area provided with a prechamber spark gap; and a second sparking area provided with a main chamber spark gap; the method comprises the steps of: sending a first high voltage ignition pulse to the first center wire assembly so that the prechamber spark gap is fired in response to a first set of engine operating conditions; and sending a second high voltage ignition pulse to the second center wire assembly so that the main chamber spark gap is fired in response to a second set of engine operating conditions.

In accordance with various embodiments, the method may have any one or more of the following features, either singly or in any technically feasible combination:

the first set of engine operating conditions include high engine speeds or high load conditions, and the second set of engine operating conditions include low engine speeds or low load or start up conditions;

the prechamber spark gap and the main chamber spark gap are fired in a mutually exclusive manner; and/or the prechamber spark gap and the main chamber spark gap are fired in a concurrent manner.

DRAWINGS

Preferred embodiments will hereinafter be described in conjunction with the appended drawings, wherein like designations denote like elements, and wherein.

DESCRIPTION

The spark plug disclosed herein has multiple spark gaps, where at least one of the spark gaps is located within a prechamber and at least one of the spark plugs is located within a main combustion chamber. For most internal combustion engines, when the engine is operated at high engine speeds or under high load conditions, the performance and/or operation of the engine can be improved with the use of a prechamber spark gap (i.e., a spark gap where ignition is first initiated in a prechamber). The same is not necessarily true, however, when the engine is operated at low engine speeds or under low load or certain start up conditions, as engine performance and/or operation in these instances is typically improved through the use of a main chamber spark gap (i.e., a traditional spark gap where ignition is first initiated in a main combustion chamber). Thus, the present spark plug is designed to maximize engine performance and/or operation by utilizing multiple spark gaps, including a prechamber spark gap for certain operating conditions where such a spark gap is advantageous and a separate main chamber spark gap for other conditions where a main chamber spark gap is advantageous. The multiple spark gaps may be operated independent of one another, together with one another, and/or according to a hybrid scheme that utilizes both independent and coordinated operation, depending on the requirements of the application.

Figure 1:
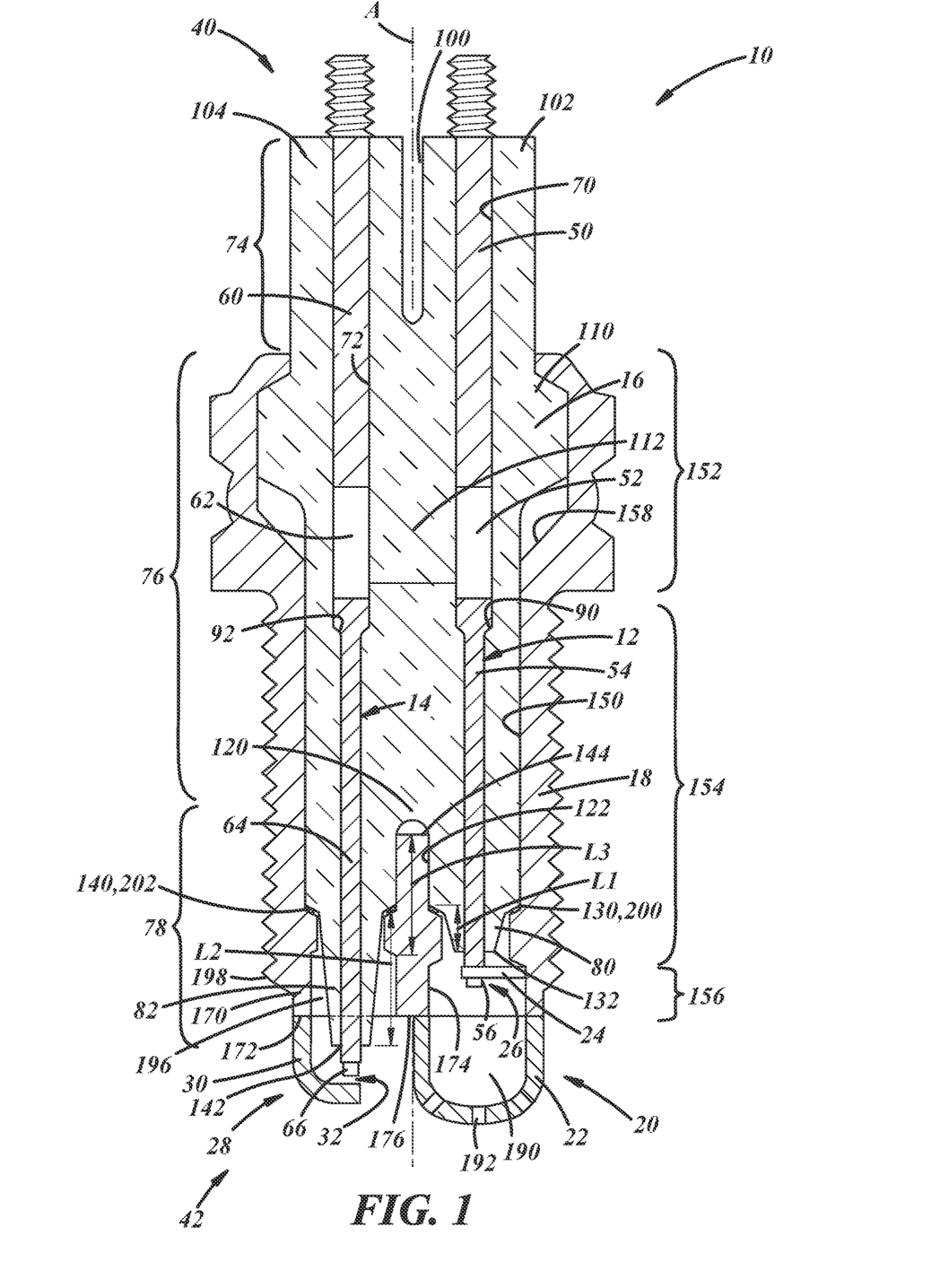
FIG. 1 is a cross-sectional view of an example of a spark plug with multiple spark gaps.

Referring to FIG. 1, there is shown an example of a spark plug with multiple spark gaps. Spark plug 10 includes a first center wire assembly 12, a second center wire assembly 14, an insulator 16, a metallic shell 18, a first sparking area 20 with a prechamber cap 22 and a ground electrode 24 for a prechamber spark gap 26, and a second sparking area 28 with a ground electrode 30 for a main chamber spark gap 32. Generally speaking, the spark plug 10 extends from a terminal end 40 to a firing end 42 along a central or longitudinal axis A. It should be appreciated that the embodiment illustrated in FIG. 1 is simply a non-limiting example of a spark plug with multiple spark gaps and that other multi-gap spark plug embodiments are certainly possible, such as ones with one or more surface discharge spark gap(s), semi-surface spark gap(s), annular ground electrode spark gap(s), and multi-ground electrode spark gap(s), as well as ones with multiple prechamber spark gaps or no prechamber spark gaps, etc.

First center wire assembly 12, sometimes referred to as a center wire assembly, is located within a first axial bore of the insulator and conducts an ignition pulse from an ignition system to the prechamber spark gap 26. According to a non-limiting embodiment, first center wire assembly 12 may include a terminal electrode component 50, a seal 52, a center electrode component 54, as well as any other known center wire elements. Terminal electrode component 50 is designed to physically and electrically receive a boot from an ignition wire (not shown) at the terminal end 40 and to conduct a high voltage ignition pulse from the ignition wire to the seal 52. Seal 52 is an optional component that is typically located in the insulator bore between the terminal electrode component 50 and the center electrode component 54 and is designed to conduct the ignition pulse, while at the same time suppressing unwanted electromagnetic interference or noise that could impact other parts of the vehicle's electrical system. The seal 52 could be a glass seal, a conductive seal, a resistive seal, a suppressive seal, a fired-in seal, and/or a fusible seal, to cite a few possibilities, and it can be formed from powder, liquid or solid precursor materials. Center electrode component 54, sometimes referred to as a center electrode pin, is located towards the firing end 42 and is designed to conduct the ignition pulse to the prechamber spark gap 26, at which point a spark or arc will form across the spark gap to the ground electrode 24. According to one embodiment, center electrode component 54 includes an outer sheath made from a nickel-based material and an inner core made from a thermally conductive metal, such as a copper-based material. As understood in the art, center electrode component 54 may include a firing tip 56 made from a precious metal alloy like a platinum-based or iridium-based material, although this is not necessary. The firing tip 56 may be a single- or multi-piece disc, rivet, column, bar, ring, sleeve or other shaped tip that includes a sparking surface exposed to the prechamber spark gap 26. It should be appreciated that the aforementioned components of the first center wire assembly 12, as shown in FIG. 1, are merely exemplary, as other suitable examples, embodiments, materials, sizes, shapes, combinations of components, etc. could be used instead.

Second center wire assembly 14 is located within a second axial bore of the insulator and conducts an ignition pulse from an ignition system to the main chamber spark gap 32. As shown in FIG. 1, the first and second center electrode assemblies 12, 14 both extend from a terminal end 40 towards a firing end 42 of the spark plug and are generally parallel to one another, as well as being parallel to the central axis A of the spark plug (the assemblies 12, 14 are offset from the central axis A by a certain radial distance). The first and second center electrode assemblies 12, 14 can operate independently of one another such that one of the spark gaps 26, 32 fires and initiates combustion while the other spark gap does not, or the they could operate together such that both spark gaps fire at the same time. In one embodiment, second center wire assembly 14 may include a terminal electrode component 60, a seal 62, a center electrode component 64, a firing tip 66, as well as any other known center wire elements. The components of the second center wire assembly 14 are largely the same as those of the first center wire assembly 12, thus, the description above applies here as well. One potential difference involves the size and/or shape of the center electrode components 54, 64. As illustrated in FIG. 1, the main chamber spark gap 32 is closer to the firing end 42 than is the prechamber spark gap 26, thus, the center electrode component 64 is longer than and extends beyond the center electrode component 54. It is also possible that the diameters, shapes, materials, firing tips, etc. of these center electrode components could differ as well, based on the particular needs of their corresponding sparking areas.

Insulator 16 is disposed within an axial bore of the shell 18 and is constructed from a material, such as a ceramic material, that is sufficient to electrically insulate the first and second center wire assemblies 12, 14 from the metallic shell 18. In one example, the insulator 16 includes a first axial bore 70, a second axial bore 72, a terminal end section 74, a central section 76, and a firing end section 78 with a first insulator nose component 80 and a second insulator nose component 82. Like their center wire assembly counterparts, the first and second axial bores 70, 72 extend from a terminal end 40 towards a firing end 42 of the spark plug and are generally parallel to one another, as well as being parallel to the central axis A (axial bores 70, 72 are offset from the central axis A by a certain radial distance). At one or more locations along their axial extent, the first and/or second axial bores 70, 72 may include diametrically reduced interior shoulders 90, 92 to receive and support complimentary features of center electrode components 54, 64. FIG. 1 only shows one interior shoulder per axial bore, but this is not required, as the axial bores could have more or less of such features, as well as any other suitable features known in the art.

Figure 2:
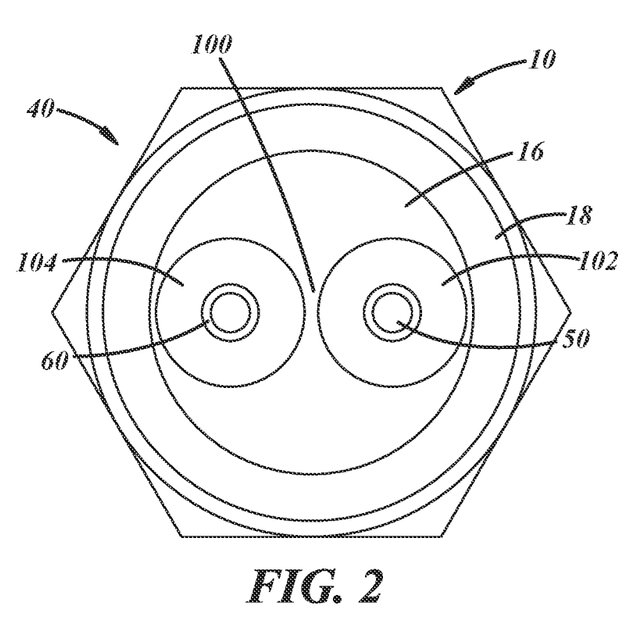
FIG. 2 is a top view of the spark plug from FIG. 1.
Figure 3:
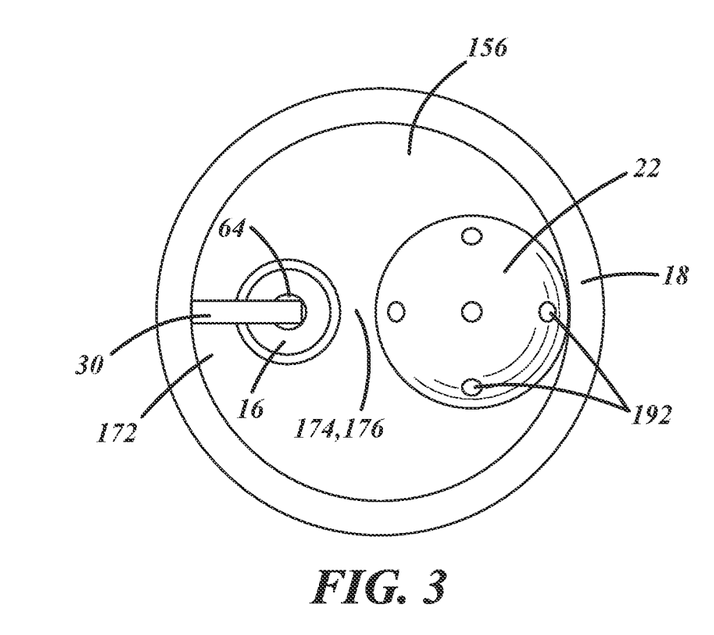
FIG. 3 is bottom view of the spark plug from FIG. 1.

Terminal end section 74 is the portion of the insulator 16 that is located closest to the terminal end 40 and, in addition to portions of the first and second axial bores 70, 72, it may include a terminal end recess 100 that separates first and second terminal end columns 102, 104. With most traditional spark plugs, the insulator includes a single axial bore that accommodates a single center wire assembly and extends along the central axis of the spark plug. The present insulator, however, includes two separate axial bores that accommodate two separate center wire assemblies, thus, it does not include a traditional axial bore extending the entire length of the insulator along the central axis of the spark plug. Terminal end recess 100 is a recess or space that extends along the central axis A of the spark plug from the terminal end 40 to a certain depth so that it separates and helps define the first and second terminal end columns 102, 104. As illustrated in the non-limiting example of FIG. 2, the terminal end columns 102, 104 are both cylindrical and have a generally uniform outer diameter, but this is not necessary, as they could be tapered or have some other configuration. The exact shape and dimensions of the terminal end recess 100, as well as those of the first and second terminal end columns 102, 104, can vary as needed. It should be appreciated that the exemplary insulator terminal end structure shown in FIGS. 1 and 2 is not necessary, as it is possible for the terminal end section 74 to have a single terminal end column that accommodates both the first and second axial bores 70, 72 (i.e., the terminal end recess 100 could be omitted so that columns 102 and 104 are merged).

Central section 76 is the portion of the insulator 16 that is located towards the middle or axial center of the insulator and includes a diametrically enlarged locking portion 110, as well as a central section solid center 112. The locking portion 110 is a section of the insulator 16 that is diametrically enlarged so that the shell 18 can be crimped and/or shrank (e.g., by electrical upsetting) over top of and, thus, securely attached to the insulator. The locking portion 110 can have any number of suitable sizes and shapes, as well as other components like an annular gasket or seal, and is not limited to the illustrated example. As appreciated by those skilled in the art, most traditional insulators have a single axial bore that extends along its entire central axis so as to accommodate a single center wire assembly. Insulator 16, however, with its first and second axial bores 70, 72 that are radially offset or spaced from the central axis A, may have a central section solid center 112 that is located between the two axial bores, along the central axis. The solid center 112 separates the first and second axial bores 70, 72 and helps insulate or electrically isolate the first and second center electrode assemblies 12, 14 from one another.

Firing end section 78 is the portion of the insulator located near the firing end 42 and, according to the illustrated embodiment, includes a first insulator nose component 80, a second insulator nose component 82, a firing end solid center 120, and a firing end recess 122. As explained above, most traditional spark plugs only have a single center wire assembly, which means that they typically only have a single insulator nose component (also called a core nose). The spark plug described herein has multiple center wire assemblies and, thus, has multiple insulator nose components 80, 82. The first insulator nose component 80 insulatively supports the center electrode component 54, which is part of the first center wire assembly 12 and operates as part of the prechamber spark gap 26, and it includes a diametrically-reduced exterior shoulder 130 and a first distal end 132. As shown in FIG. 1, the first insulator nose component 80 has an axial length L1 that may be shorter than a corresponding axial length L2 of the second insulator nose component 82, and it tapers down in terms of its outer diameter from the exterior shoulder 130 to the first distal end 132. According to a non-limiting example, the first insulator nose component 80 has an axial length L1 that is between 3 mm-9 mm, inclusive, an outer radius at the exterior shoulder 130 that is between 0.5 mm-1.0 mm, inclusive, and an outer radius at the distal end 132 that is between 0.3 mm-0.5 mm, inclusive.

Second insulator nose component 82 insulatively supports the center electrode component 64, which is part of the second center wire assembly 14 and operates as part of the main chamber spark gap 32, and it includes a diametrically-reduced exterior shoulder 140 and a second distal end 142. The second insulator nose component 82 has an axial length L2 that may be longer than the corresponding axial length L1 of the first insulator nose component 80, and it too tapers down in terms of its outer diameter from the exterior shoulder 140 to the distal end 142. The projection or reach of the second insulator nose component 82 may be greater than that of the first insulator nose component 80 since the center electrode component 64, which it holds, is part of a main chamber spark gap 32, which in this example is a standard J-gap. Accordingly, the distal end 142 of the second insulator nose component 82 projects or extends farther, in the direction of firing end 42, than does distal end 132. According to a non-limiting example, the second insulator nose component 82 has an axial length L2 that is between 5 mm-11 mm, inclusive, an outer radius at the exterior shoulder 140 that is between 0.5 mm-1.0 mm, inclusive, and an outer radius at the distal end 142 that is between 0.3 mm-0.5 mm, inclusive. Of course, other shapes, sizes, embodiments, etc. may be use for the first and/or second insulator nose components, as the present spark plug is not limited to the aforementioned examples.

Firing end solid center 120 refers to the insulator material that is located in the middle of the insulator firing end, towards the central axis A, and connects or bridges the two sides of the insulator together. Firing end recess 122, on the other hand, is the recess or space that extends along the central axis A of the spark plug from the firing end 42 up into the insulator so that it separates and helps define the first and second insulator nose components 80, 82. In addition to helping separate and define the two insulator nose components, the firing end recess 122 is designed to receive and accommodate a middle section of the shell 18 that is instrumental for properly supporting the insulator 16 within the shell 18, as will be explained in more detail. In one embodiment, the firing end recess 122 is a columnar shaped recess with sidewalls that are generally parallel to one another and to the central axis A; in a different embodiment, the sidewalls of the firing end recess are tapered somewhat such that the recess gets narrower the farther up into the insulator it goes. The axial length L3 of the firing end recess 122, which is defined as the axial length from the nearest distal end of the two insulator nose components (in the case of FIG. 1, the nearest distal end is distal end 132 of the first insulator nose component 80) to the end of the recess may be between 3.0 mm and 5.0 mm, inclusive. The firing end recess 122 may provide for a small gap or space 144 above the middle section of the shell so that the two components are not bottomed out and in direct contact with one another. According to the non-limiting example of FIG. 1, the first insulator nose component 80 is retracted up into an axial bore of the shell 18 so that the distal end 132 does not extend beyond a distal end of the shell, whereas the second insulator nose component 82 extends out of an axial bore of the shell such that the distal end 142 extends beyond a distal end of the shell. Other embodiments are certainly possible.

Figure 4:
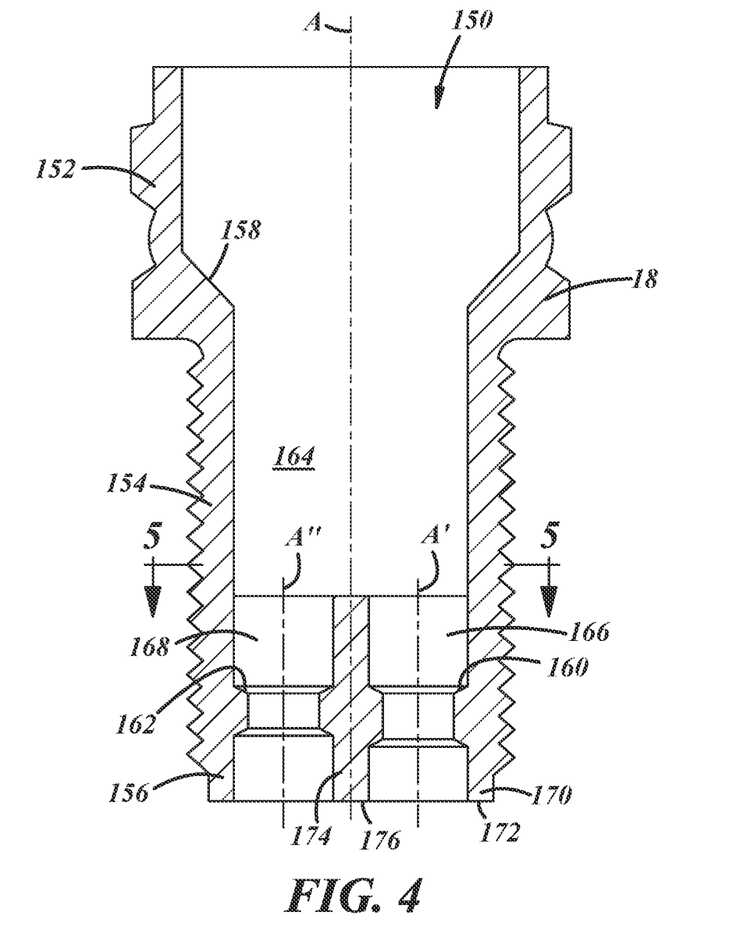
FIG. 4 is a cross-sectional view of the shell of the spark plug from FIG. 1.
Figure 5:
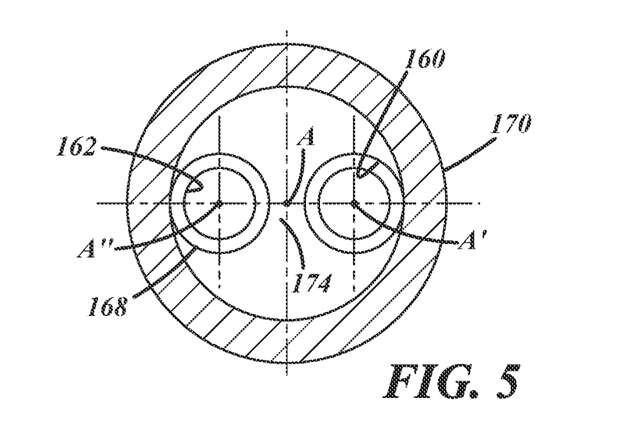
FIG. 5 is a cross-sectional view of the shell of the spark plug from FIG. 4, taken along lines 5-5.

Shell 18 is constructed from a material, such as steel or another metal alloy, and includes an axial bore 150, a locking section 152, a threaded section 154, and a firing end section 156. In some ways, the axial bore 150 is like a common axial or center bore found on traditional spark plugs (e.g., it may include a series of diametrically-reduced interior shoulders, like 158). One way in which the axial bore 150 may differ from most traditional insulator axial bores is that it may have an enlarged inner diameter, as needed to accommodate a wider insulator 16 with two separate axial bores 70, 72. Another way the axial bore 150 is different than traditional insulator axial bores is that it may include a number of different bore sections, including axial bore sections 164, 166 and 168 (see FIGS. 4 and 5). Axial bore section 164 is a somewhat standard bore section, in that it extends along the center axis A of the plug and generally takes up the entire interior space of the shell 18. Axial bore section 164 may have a somewhat larger inner diameter at certain portions to accommodate the locking portion 110 of the insulator, as is understood in the art.

Axial bore sections 166, 168, on the other hand, are designed to accommodate the first and second insulator nose components 80, 82, respectively, and are smaller in terms of their inner diameters than that of axial bore section 164. Axial bore section 166 has its own central axis A' and may include an interior shoulder 160 for supporting a corresponding exterior shoulder 130 of the first insulator nose component 80, as already mentioned. Similarly, axial bore section 168 has its own central axis A" and includes an interior shoulder 162 for supporting a corresponding exterior shoulder 140 of the second insulator nose component 82. Sealing elements 200, 202 may be provided in the form of gaskets or other types of seals and are positioned between shoulders 130, 160 and between shoulders 140, 162, respectively, so that the space between the insulator 16 and the shell 18 is adequately sealed. This also avoids having the ceramic insulator 16 sit directly on the metal shell 18, which could cause cracking or other damage to the insulator. The interior shoulder sections 160, 162 of the first and second axial bore sections 166, 168 may be at different axial locations along the shell or they may be positioned at the same axial locations.

Locking section 152 includes a diametrically-enlarged section that can be crimped, bent, swaged and/or otherwise shrank over top of an upper end of the central section 76 of the insulator so that the two components are securely attached to one another. The locking section 152 may also include a hex or other feature that enables the spark plug to be engaged by a wrench or other tool for installation and/or removal of the spark plug from a cylinder head. The threaded section 154 is designed so that the spark plug can be threaded into a complementary threaded hole in the cylinder head, as is widely appreciated in the art. Although not mandatory, the threaded section 154 may have an outer diameter that corresponds to an M10, M12, M14 or even larger size plug. It should be appreciated that the axial bore 150, the locking section 152 and/or the threaded section 154 may have any combination of known features and are not limited to the exemplary embodiment shown.

Firing end section 156 is the portion of the shell that it located closest to the firing end 42 and includes an outer support component 170 with a distal end 172 and an inner support component 174 with a distal end 176. The outer support component 170 and distal end 172 simply refer to the lower axial end of the shell 18 and its corresponding annular surface to which the prechamber cap 22 is at least partially attached, and the ground electrode 30 is attached. Those skilled in the art will appreciate that the prechamber cap 22 and/or ground electrode 30 can be laser welded, resistance welded and/or otherwise attached to the outer and/or inner support component 170, 174 according to any number of known methods.

Figure 6:
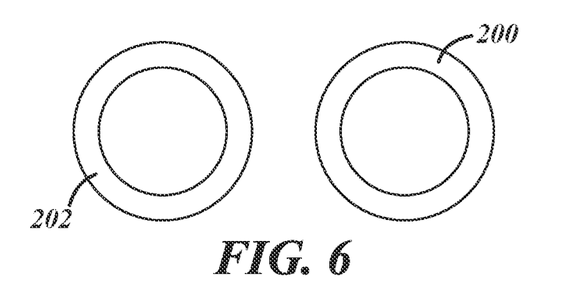
FIG. 6 is a top view of an example of sealing elements that may be used with the spark plug from FIG. 1.
Figure 7:
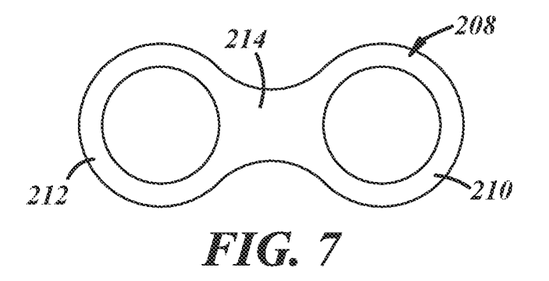
FIG. 7 is a top view of another example of a sealing element that may be used with the spark plug from FIG. 1.

Inner support component 174 is rather unique and is designed to provide the spark plug with several useful features, as further illustrated in FIGS. 1 and 3-5. First, the inner support component 174 helps support the first and second insulator nose components 80, 82 via diametrically reduced interior shoulders 160, 162. Interior shoulders or ledges 160, 162 annularly extend around first and second axial bore sections 166, 168, respectively, so that each interior shoulder is at least partially located towards the outer support component 170, as well as the inner support component 174 (i.e., towards the central axis A of the spark plug). The interior shoulders 160, 162 are sized and shaped to receive corresponding exterior shoulders 130, 140 of the first and second insulator nose components 80, 82, respectively, so that they are securely supported within the shell. Sealing elements 200, 202, separately shown in FIG. 6, can be annular gaskets, rings, seals, etc., and are designed to be interposed between the interior shoulders 160, 162 of the shell and the exterior shoulders 130, 140 of the insulator, respectively, so that gas tight seals are formed therebetween. According to another embodiment shown in FIG. 7, the sealing elements may be combined into a single integrated sealing element 208 that is generally in the shape of the infinity symbol and includes sealing element sections 210, 212 and a center section 214. The FIG. 7 embodiment may be used with a spark plug where the interior shoulders 160, 162 are located towards the top of the first and second axial bore sections 166, 168, so that the center section 214 is able to span or bridge the space in between without interference from the inner support component 174. The sealing elements 200, 202, 208 may be circular, oval, infinity-shaped and/or have another shape; they may be flat, tapered or angled; they may be two separate pieces or they may be combined into a single integrated sealing element; they may be located at different axial positions along the spark plug, and they may be comprised of any suitable metal, metal alloy, composite material, polymer or other suitable material known in the art, to cite a few possibilities.

Figure 8:
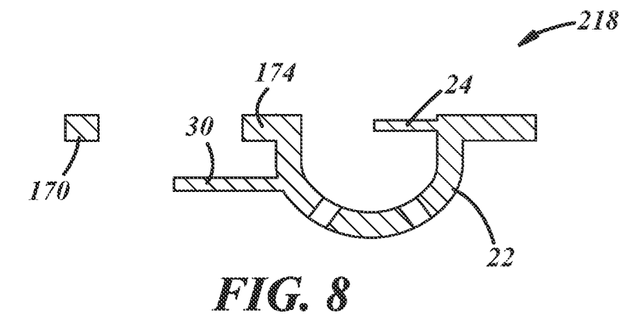
FIG. 8 is a cross-sectional view of an example of a subassembly that may be attached to a firing end section of the shell.
Figure 9:
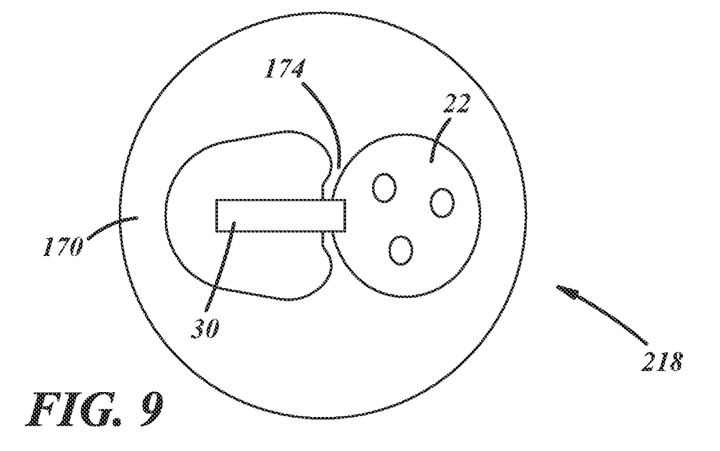
FIG. 9 is a bottom view of the subassembly of FIG. 8.

Second, the inner support component 174 is designed to provide a surface, such as distal end 176, to which the prechamber cap 22 can be mechanically and/or electrically connected. Without the inner support component 174 and distal end 176, the prechamber cap 22 would not have a substantial surface to weld to and, thus, would not be fully attached to the shell. According to one example, the entire shell 18, including the inner support component 174, is made from a single or integral piece of steel that may be extruded, drawn, machined, bored, additive manufactured (e.g., 3D printed) and/or otherwise manufactured to the desired shape. Such an arrangement is illustrated in the cross-sectional views of FIGS. 1 and 4. According to another example, the inner support component 174 is made separately from the rest of the shell 18, which can be extruded, drawn and/or otherwise formed from a hollow tubular structure, and is then welded to the bottom and/or inside of the shell, such as at the firing end section 156 and/or the threaded section 154. A non-limiting example of such an arrangement is shown in FIGS. 8 and 9, where the prechamber cap 22, ground electrode 24, ground electrode 30, outer support component 170, and inner support component 174 are first made into a subassembly 218 (e.g., by individually manufacturing and then welding one or more of these components together or by additive manufacturing (e.g., 3D printing)). The subassembly 218 may then be attached to the firing end section 156 and/or the threaded section 154 of the shell. In such an example, the inner support component 174 may be made from the same metal as the rest of the shell (e.g., a steel) or it may be made from a more corrosion and/or erosion resistant metal alloy, such as one having noble metal(s), nickel, titanium, zirconium, tungsten or a combination thereof. It is possible for the inner support component 174 and/or other components of the subassembly 218 to include thermal management features, such as internal copper cores, to help remove unwanted heat from that area. The exposed surface area of the inner support component 174 in FIG. 9 may be designed to be less than the exposed surface area shown in FIG. 3. Reducing the amount of exposed shell surface area that faces the main combustion chamber, such as the exposed surface area of the inner support component 174, may help regulate the temperature of the spark plug towards the firing end 42. It should be appreciated that the inner support component 174, as well as the other components of the firing end section 158, are not limited to any particular embodiment, design, material and/or manufacturing method.

First sparking area 20 may include a prechamber cap 22, center electrode component 54 and ground electrode 24, and provides the spark plug with a prechamber spark gap 26. As mentioned above, prechamber spark gaps may be advantageous when the engine is operating at high engine speeds, under high load conditions and/or with lean air/fuel mixtures. In the example of FIG. 1, the prechamber cap 22 is dome-shaped or semi-spherical and is welded to the bottom of the shell 18 so that a prechamber 190 is formed, however, the prechamber cap could be have a semi-ovoid or other shape instead. The prechamber 190 is a space or volume that may be defined by a combination of the insulator 16, the shell 18, and/or the prechamber cap 22 and is in communication with a main combustion chamber via one or more openings 192 in the prechamber cap. At the open end of the prechamber cap 22 (i.e., the end that is attached to the bottom of the shell), the attachment surface of the prechamber cap may simply be a flat annular surface, as illustrated in FIG. 1, or it may have an annular notch so that concentric annular attachment surfaces are formed that can nest or fit into corresponding annular attachment surfaces on the bottom of the shell. This may assist with tolerance control, for example, and can create an arrangement where annular portions of the prechamber cap 22 and the bottom surface of the shell 18 axially overlap with one another. In the particular embodiment of FIG. 1, the prechamber 190 is a space or volume that is defined by the distal end 132 of the first insulator nose component 80, an interior surface of the firing end section 156 of the shell, a surface of the inner support component 174 of the shell, and an inner surface of the prechamber cap 22. Of course, other arrangements and configurations are certainly possible. The ground electrode 24 may be attached to an interior surface of the firing end section 156 of the shell and project radially inward, as illustrated, or it may be attached to an interior surface of the prechamber cap 22 or at a junction between the shell and the cap, to cite a few possibilities. Instead of the arrangement shown in FIG. 1, it is possible for the prechamber spark gap 26 to be located in the prechamber 190 but have a traditional J-gap configuration, like main chamber spark gap 32, or be a surface discharge spark gap, a semi-surface spark gap, an annular ground electrode spark gap, a multi-ground electrode spark gap, etc. The ground electrode 24 may or may not have a precious metal firing tip, like firing tip 56 of the center electrode. The term "prechamber spark gap," as used herein, broadly means any spark gap that is at least partially encompassed by a prechamber cap and, thus, is at least somewhat shielded from a main combustion chamber.

Second sparking area 28 includes center electrode component 64 and ground electrode 30, and provides the spark plug with a main chamber spark gap 32. As mentioned above, main chamber spark gaps may be advantageous when the engine is operating at low engine speeds or under low load or certain start up conditions. In the exemplary embodiment of FIG. 1, an axial end of the center electrode component 64 (with or without a firing tip 66) and a side surface of the ground electrode 30 form an air gap or aerial type spark gap 32 in a main combustion chamber of the engine (not shown). Center electrode component 64 and/or ground electrode 30 may or may not have a precious metal firing tip attached thereto to increase their durability and performance, as explained above. Ground electrode 30 may be laser or resistance welded and/or otherwise attached to the distal end surface 172 of the outer support component 170 of the shell and extend towards the main chamber spark gap 32 in both axial and radial directions. According to one example, a circumferential space 196 is located between an outer surface of the second insulator nose component 82 and an inner surface of the firing end section 156 of the shell and acts as a breathing space to help ensure proper electrical shunting and cleaning. As with the first sparking area 20, however, many different arrangement and configurations are possible. For instance, it is possible for the second sparking area 28 to have a main chamber spark gap 32 that is formed with one or more straight ground electrodes (like ground electrode 24), a surface discharge spark gap, a semi-surface spark gap, an annular ground electrode spark gap, a multi-ground electrode spark gap, etc. It is also possible for the second sparking area 28 to have shell skirt (e.g., an extension of the firing end section 156 of the shell), with or without slots or other openings formed therein, so that a swirl chamber or the like is created around the spark gap 32. In such an example, the swirl chamber may be open at its axial end so that it is at least somewhat exposed to the main combustion chamber. The term "main chamber spark gap," as used herein, broadly means any spark gap that is not fully encompassed by a prechamber cap and, thus, is at least somewhat exposed to a main combustion chamber.

It is possible for the spark plug to include different sparking area combinations, including combinations not specifically illustrated in the drawings. As described above, spark plug 10 may include a first sparking area 20 with a prechamber spark gap and a second sparking area 28 with a main chamber spark gap that does not include a shell extension or swirl chamber (e.g., the arrangements shown in FIGS. 1 and 10-12). In a different example, the spark plug 10 may include a first sparking area 20 with a prechamber spark gap and a second sparking area 28 with a main chamber spark gap that is at least partially surrounded by a shell extension or shell skirt so that it is located in a swirl chamber. In yet another example, spark plug 10 may have a first sparking area 20 with a prechamber spark gap and a second sparking area 28 with a prechamber spark gap (e.g., the spark plug may include multiple prechamber caps, such as ones having different prechamber volumes, cap opening or hole arrangements, orientations, sizes, patterns, etc. that produce different ignition jets from the prechamber to the main combustion chamber). It is further possible for the spark plug 10 to include a first sparking area 20 with a main chamber spark gap and a second sparking area 28 with a main chamber spark gap (e.g., the spark plug may include multiple main chamber spark gaps located within and/or not located within swirl chambers). The foregoing examples, which can utilize any combination of the different spark gaps described herein (e.g., a J-gap, an aerial spark gap, a side surface spark gap, a surface discharge spark gap, a semi-surface spark gap, an annular ground electrode spark gap, a multi-ground electrode spark gap, etc.) are only some of the arrangements that are possible, as the present invention is not limited to any particular one.

As illustrated in the drawings, spark plug 10 is not rotationally symmetrical about the central axis A of the spark plug. Thus, the rotational position of the first and second sparking areas 20, 28, with respect to the main combustion chamber, may have an impact on the performance of the spark plug. Thus, it is possible to manufacture the threaded section 154 such that a thread start 198 and/or other rotational alignment features are located at a certain circumferential position, with respect to the first and second sparking areas 20, 28, such that once the spark plug is screwed into and installed in the engine, the first and second sparking areas will assume predetermined positions within the main combustion chamber or cylinder. These predetermined positions may be correlated to the locations of intake valves, exhaust valves, fuel injectors, etc.

In operation, spark plug 10 is designed to maximize engine performance and/or operation under a variety of different conditions by utilizing spark gaps 26 and/or 32 in ways that take advantage of the desirable qualities of each spark gap. According to one example, when the engine is operating according to high engine speed and/or high load conditions, a high voltage ignition pulse may be provided to the first center wire assembly 12 such that a spark forms at the prechamber spark gap 26. This spark, in turn, initiates combustion in the prechamber 190, from which the combustion process spreads to the main combustion chamber via openings 192 in the prechamber cap 22. When the engine is operating in a low engine speed and/or low load or startup conditions, for example, a high voltage ignition pulse may be provided to the second center wire assembly 14 such that a spark is formed at the main chamber spark gap 32. In this example, the spark initiates a combustion process and does so at least partially in the main combustion chamber, as opposed to being in a prechamber. Skilled artisans will appreciate that the conditions surrounding proper prechamber and/or main combustion chamber operation are many and varied and that the preceding operational description is one of a more general nature. It should be pointed out that the prechamber spark gap 26 is not limited to firing in high engine speed and/or high load conditions, nor is the main chamber spark gap 32 limited to firing in low engine speed and/or low load or startup conditions. It is possible for operation of the prechamber spark gap 26 and the main chamber spark gap 32 to be mutually exclusive (i.e., the spark gaps are not fired at the same time), to be concurrent (i.e., the spark gaps are fired at the same time), or to be operated according to a hybrid type model that uses both techniques. Spark plug 10 is not limited to any particular operational scheme.

Figures 10, 10A:
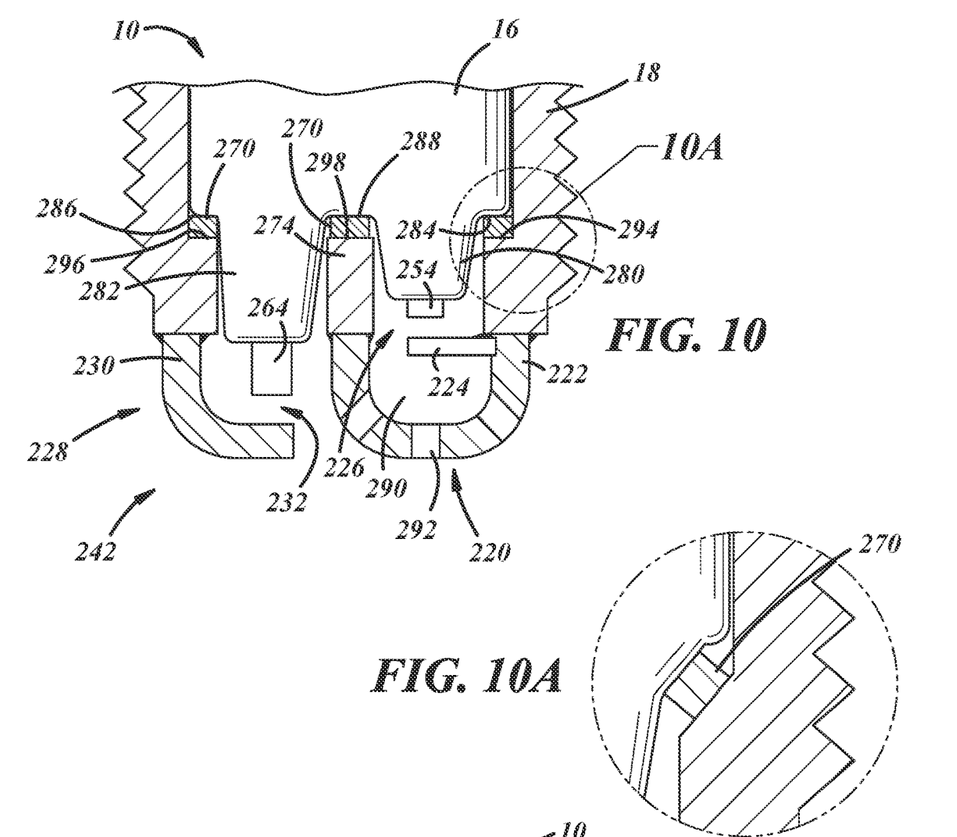
FIG. 10 is a partial cross-sectional view of an example of another embodiment of a spark plug with multiple spark gaps, where some of the features of a first sparking area are different.
FIG. 10A is an enlarged view of a section of FIG. 10.

Turning now to FIG. 10, there is shown another embodiment of spark plug 10 with an insulator 16 and shell 18, only the firing end 242 differs somewhat from that of the previous embodiment. In this example, the firing end 242 includes a first sparking area 220 with a dome-shaped prechamber cap 222 forming a prechamber 290 surrounding a center electrode component 254 and a ground electrode 224 that form a prechamber spark gap 226, much in the same way as the previous embodiment. The ground electrode 224 is attached to an interior surface of the prechamber cap 222 at or near a junction between the cap and a lower or firing end section of the shell 18, and forms the prechamber spark gap 226 with the axial end of the center electrode component 254 (in the previous embodiment, the ground electrode 24 formed the prechamber spark gap 26 with a side surface of the center electrode component 54). Either arrangement, as well as others, is possible. Openings 292 in the prechamber cap 222 allow the prechamber 290 to communicate with a main combustion chamber (not shown), both in terms of an incoming air/fuel mixture and an outgoing series of flames. Turning now to a second sparking area 228, a center electrode component 264 and a ground electrode 230 form a main chamber spark gap 232 in largely the same way as the previous embodiment. Another difference, however, is how the insulator 16, with its first and second insulator nose components 280, 282, is seated on and supported by the shell 18. In this embodiment, the exterior shoulders 284, 286 of the first and second insulator nose components 280, 282 and an additional shoulder 288 which spans components 280, 282 are supported by interior shoulders 294, 296, 298, respectively. Interior shoulder 298 acts as a landing and preferably includes an upper axial surface of the inner support component 274 of the shell. In order for the insulator 16 and shell 18 to properly seat and seal against one another, a seal or sealing ring 270 may be used (the sealing ring may include two separate sealing components, one for each of the insulator nose components 280, 282, or it may be a combined sealing component, such as those respectively shown in FIGS. 6 and 7). In FIG. 10, the interior and exterior shoulders are flat, however, it should be understood that such shoulders, as well as the intervening seals 270, could be tapered or angled instead, as shown in FIG. 10A.

Figure 11:
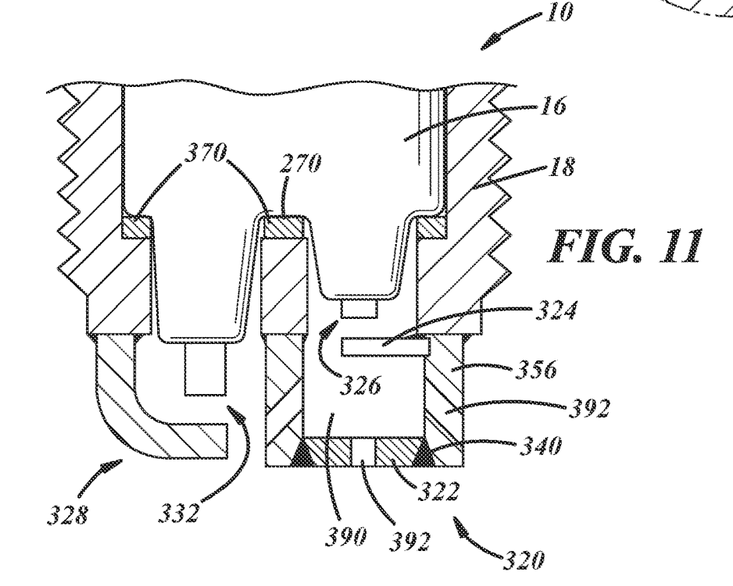
FIG. 11 is a partial cross-sectional view of an example of yet another embodiment of a spark plug with multiple spark gaps, where a prechamber cap and some other features of a first sparking area are different.

With respect to FIG. 11, there is shown another embodiment of a spark plug 10 with first and second sparking areas 320, 328. The first sparking area 320 includes a prechamber 390 surrounding a prechamber spark gap 326, but in this example, a firing end section 356 of the shell 18 extends further in the axial direction than does its counterparts in the previous embodiments. As illustrated in FIG. 11, a ground electrode 324 is attached to an interior surface of the firing end section 356 and extends radially towards the prechamber spark gap 326. A prechamber cap 322 is disk-shaped and may be circumferentially welded to inside surfaces of the firing end section 356 at weldment 340 or, in a different embodiment, the cap 322 may be welded to the axial end surface of the firing end section 356. In either event, it may be preferable for the prechamber cap 322 and/or the walls of the firing end section 356 of the shell to have one or more openings 392 to allow for communication between the prechamber 390 and the main combustion chamber, as already explained. Other aspects of this embodiment, such as second sparking area 328, interior/exterior shoulders and sealing component 370 may be similar to those already described.

Figures 12, 13, 14:
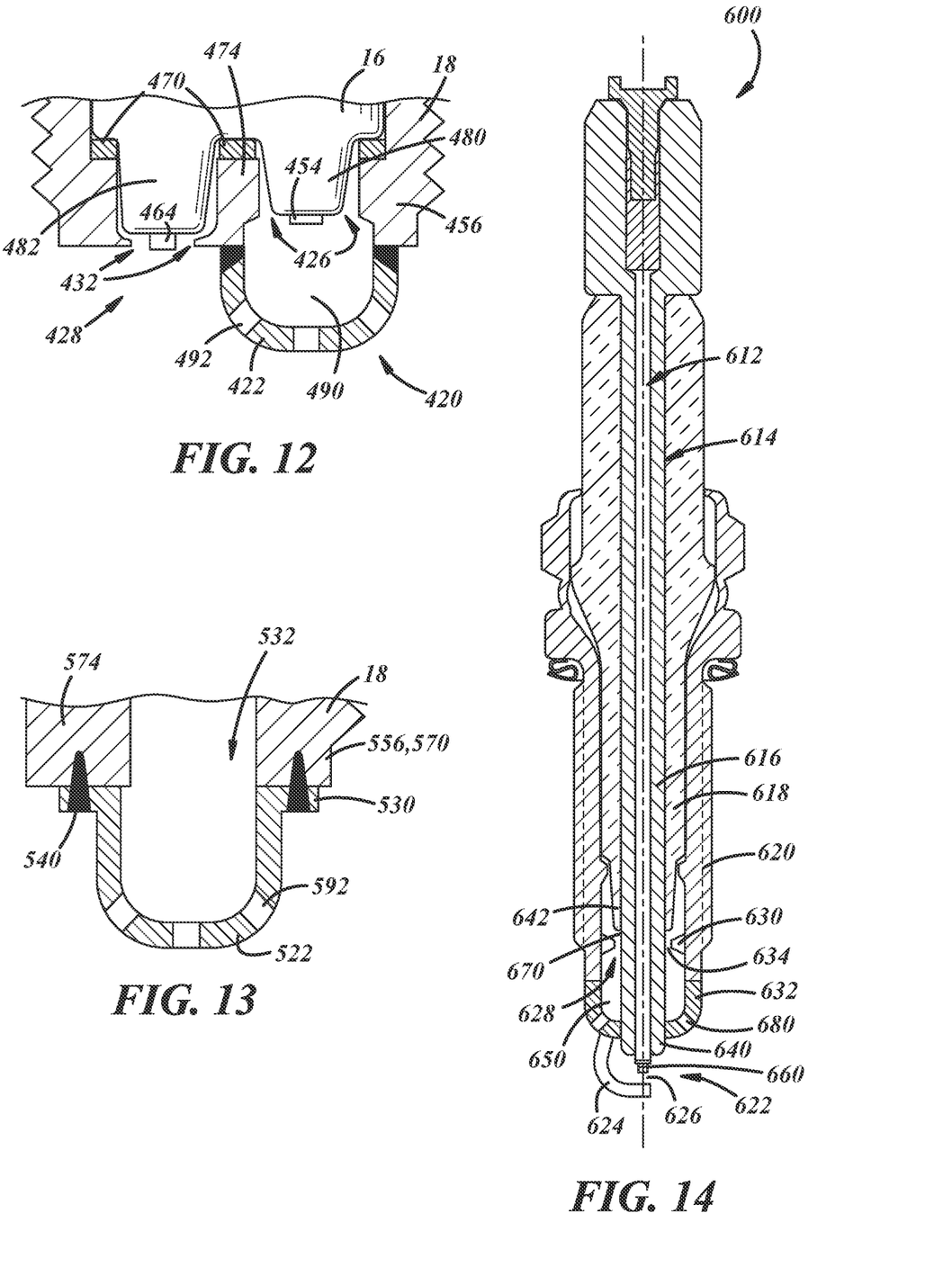
FIG. 12 is a partial cross-sectional view of an example of yet another embodiment of a spark plug with multiple spark gaps, where the first and second sparking areas include semi-surface spark gaps.
FIG. 13 is a cross-sectional view of an example of another embodiment of a prechamber cap.
FIG. 14 is a cross-sectional view of another example of a spark plug with multiple spark gaps.

Turning to FIG. 12, there is shown an embodiment of the spark plug 10 where the first and second sparking areas 420, 428 have semi-surface or semi-creeping spark gaps. For instance, first sparking area 420 includes a center electrode component 454 that provides a spark that may travel or propagate along an outer surface of the first insulator nose component 480 before jumping over to an interior surface of a firing end section 456 of the shell 18 and/or a surface of inner support component 474, which may also be part of the shell, in order to form a prechamber spark gap 426. A prechamber cap 422 may create or define a prechamber 490 and have one or more openings 492, as already explained. The second sparking area 428, on the other hand, includes a center electrode component 464 that provides a spark that can travel along an outer surface of a second insulator nose component 482 before jumping or arcing over to the interior surface of the firing end section 456 and/or a surface of inner support component 474 thereby forming a main chamber spark gap 432. Other aspects of this embodiment, such as interior/exterior shoulders and sealing component 470 may be similar to those already described.

With respect to FIG. 13, there is shown a partial view of the firing end of a spark plug with another example of a prechamber cap 522 that is dome-shaped, except that this cap has openings 592 and a circumferential flange 530 at its open end 532. The circumferential flange 530 provides a good flat surface so that the prechamber cap 22 can be flushly seated against axial end surfaces of the shell 18 and be welded thereto with a weldment 540. More particularly, the flange 530 can be seated against axial end surfaces of a firing end section 556 of the shell having an outer support component 570 and/or an inner support component 574. In one example, the weldment 540 is formed by a laser welder and extends all the way through the thickness of the circumferential flange 530. Other embodiments, such as those created by resistance welding, can be used instead. The prechamber cap arrangement shown in FIG. 13 could be utilized with any of the embodiments disclosed in the present application.

Referring to FIG. 14, there is shown yet another example of a multi-gap spark plug 600, where this plug includes a first center wire assembly 612, a second center wire assembly 614, a first insulator 616, a second insulator 618, a shell 620, a first sparking area 622 with a ground electrode 624 forming a main chamber spark gap 626, and a second sparking area 628 with a ground electrode 630 and a prechamber cap 632 forming a prechamber spark gap 634. It should be appreciated that much of the description of the various embodiments that is provided above applies here as well and, as such, a duplicate description has been omitted.

First center wire assembly 612 is located within an axial bore of the first insulator 616 and conducts an ignition pulse from an ignition system to the main chamber spark gap 626. The first center wire assembly 612 may include any combination of suitable components, including those mentioned above in conjunction with previous embodiments.

Second center wire assembly 614 is located between the first and second insulators 616 and 618 and conducts a separate ignition pulse from the ignition system to the prechamber spark gap 634. According to one example, the second center wire assembly 614 includes a thin metal coating or layer located between an outer surface of the first insulator 616 and an inner surface of the second insulator 618 such that the high voltage ignition pulse can be conducted or conveyed along an axial length of the spark plug. The second center wire assembly 614 may also include a braze or other electrode-type component to assist with sparking.

First and second insulators 616, 618 are generally coaxial with one another, such that insulator 616 fits within an axial bore of insulator 618. The nested insulators 616, 618 are sized to accommodate the second center wire assembly 614 therebetween, as mentioned above. According to the embodiment of FIG. 14, the first insulator 616 has an insulator nose 640 that extends beyond and terminates outside of the prechamber cap 632, whereas the second insulator 618 has an insulator nose 642 that terminates inside of a prechamber 650 formed in part by the prechamber cap 632.

Shell 620 may include a locking section, a threaded section, and a firing end section, similar to the shells described above.

First sparking area 622 includes a center electrode component 660 (e.g., with or without a noble metal sparking tip) and the ground electrode 624 which together form the main chamber spark gap 626. Second sparking area 628 includes an electrode component or electrode area 670, the ground electrode 630 and the prechamber cap 632 which together help form the prechamber spark gap 634. One or more openings or apertures 680 are formed in the prechamber cap 632 so that the prechamber 650 may be in fluid communication with a main combustion chamber (not shown). Other aspects and features of spark plug 600 may be inferred from the descriptions above.

In operation, an ignition system may send a first ignition pulse to the first sparking area 622 via first center wire assembly 612. When a spark forms or jumps from the center electrode component 660 to the ground electrode 624, the combustion process is initiated in the main combustion chamber. Separately, the ignition system may send a second ignition pulse to the second sparking area 628 via second center wire assembly 614. In this instance, the high voltage pulse is conveyed along the thin metal layer in between the two insulators 616, 618 until it reaches the electrode area 670, at which point a spark may form and jump across to ground electrode 630, which may be a protrusion or ledge that radially extends from the inside of the shell towards the electrode area 670. The resulting spark may initiate a pre-combustion process in the prechamber 650, which in turn can shoot out of the openings 680 and ignite a larger combustion process in the main combustion chamber. Due to the separate center electrode assemblies 612, 614, the spark plug 600 can fire the two spark gaps 626, 634 separately or independently, can fire them together or fire them according to some type of hybrid scheme.

It should be appreciated that any number and combination of the spark plug components described herein could be manufactured using traditional manufacturing techniques (e.g., extruding, drawing, machining, drilling, boring, casting, forging, sintering, welding, etc.), as well as newer techniques like additive manufacturing techniques (e.g., 3D printing, selective laser sintering (SLS), selective laser melting (SLM), electron beam melting (EBM), etc.). For instance, any combination of the insulator 16, the shell 18, components of the first sparking area 20 (e.g., the prechamber cap 22, ground electrode 24) and/or the components of the second sparking area 28 (e.g., the ground electrode 30), etc. could be produced using additive manufacturing techniques.

It is to be understood that the foregoing is a description of one or more preferred example embodiments of the invention, and the figures are examples that are not necessarily to scale. The invention is not limited to the particular embodiment(s) disclosed herein, but rather is defined solely by the claims below. For example, it is possible for the spark plug to include three or more center electrode assemblies accommodated in three more insulator axial bores so that three or more spark gaps/sparking areas are formed. In such an arrangement, the three or more spark gaps/sparking areas may be operated independently of one another or they could be operated together. According to another possible example, two or more separate insulators could be provided to accommodate two or more separate center electrode assemblies, as opposed to using a single combined insulator. Other alternatives are certainly possible. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A spark plug, comprising:
 a first center wire assembly;
 a second center wire assembly;
 an insulator having a first axial bore for at least partially accommodating the first center wire assembly and a second axial bore for at least partially accommodating the second center wire assembly;
 a shell having an axial bore for at least partially accommodating the insulator;
 a first sparking area provided with a prechamber spark gap; and
 a second sparking area provided with a main chamber spark gap.

2. The spark plug of claim 1, wherein the first and second center wire assemblies each includes a terminal electrode component, a seal, and a center electrode component, wherein the center electrode component of the first center wire assembly helps form the prechamber spark gap and the center electrode component of the second center wire assembly helps form the main chamber spark gap.

3. The spark plug of claim 2, wherein the center electrode component of the first center wire assembly is shorter than the center electrode component of the second center wire assembly so that the prechamber spark gap is located closer to the terminal end than is the main chamber spark gap.

4. The spark plug of claim 1, wherein the insulator includes a terminal end section with a terminal end recess that separates first and second terminal end columns of the insulator.

5. The spark plug of claim 1, wherein the insulator includes a firing end section with a firing end recess that separates first and second insulator nose components.

6. The spark plug of claim 5, wherein the first insulator nose component is shorter than the second insulator nose component.

7. The spark plug of claim 1, wherein the shell includes a locking section, a threaded section, and a firing end section with an outer support component and an inner support component.

8. The spark plug of claim 7, wherein a prechamber cap that is dome-shaped with one or more openings is at least partially attached to the outer support component and the inner support component of the shell to create a prechamber.

9. The spark plug of claim 8, wherein the prechamber cap incudes a circumferential flange at an open end, the prechamber cap is welded to the shell with a weldment that passes through the circumferential flange.

10. The spark plug of claim 7, wherein a prechamber cap that is disk-shaped with one or more openings is at least partially attached to the outer support component and the inner support component of the shell to create a prechamber.

11. The spark plug of claim 7, wherein the inner support component, the prechamber cap, and at least one ground electrode are first manufactured as a subassembly, and the subassembly is then welded to the shell at the firing end section and/or the threaded section.

12. The spark plug of claim 7, wherein the inner support component of the shell is integrally formed with the rest of the shell and connects to the shell at the firing end section and/or threaded section.

13. The spark plug of claim 1, wherein the shell includes a main axial bore section with a central axis A, a first axial bore section with a central axis A', and a second axial bore section with a central axis A", the main axial bore section accommodates a central section of the insulator, the first axial bore section accommodates a first insulator nose component, and the second axial bore section accommodates a second insulator nose component, wherein the central axes A, A' and A" are all parallel to one another and are all offset with respect to one another so that they are not coaxial.

14. The spark plug of claim 13, further comprising a first sealing element and a second sealing element, the first sealing element is at least partially located in the first axial bore section of the shell and is interposed between a first interior shoulder of the first axial bore section and a first exterior shoulder of the first insulator nose component, the second sealing element is at least partially located in the second axial bore section of the shell and is interposed between a second interior shoulder of the second axial bore section and a second exterior shoulder of the second insulator nose component, wherein the first and second sealing elements are combined in a single integrated sealing element.

15. The spark plug of claim 1, wherein the first sparking area includes a prechamber cap, a center electrode component, a ground electrode, and a prechamber surrounding the prechamber spark gap, the prechamber is configured to be in communication with a main combustion chamber via one or more openings in the prechamber cap.

16. The spark plug of claim 1, wherein the second sparking area includes a center electrode component and a ground electrode to form the main chamber spark gap, the main chamber spark gap is configured to be exposed to a main combustion chamber.

17. A spark plug, comprising:
    a first center wire assembly;
    a second center wire assembly;
    an insulator having a first axial bore for at least partially accommodating the first center wire assembly and a second axial bore for at least partially accommodating the second center wire assembly;
    a shell having an axial bore for at least partially accommodating the insulator;
    a first sparking area provided with a first spark gap; and
    a second sparking area provided with a second spark gap, wherein the first spark gap is configured to be advantageous in a first set of operating conditions and the second spark gap is configured to be advantageous in a second set of operating conditions that are different from the first set of operating conditions.

18. The spark plug of claim 17, wherein the first spark gap is a prechamber spark gap and the second spark gap is a main chamber spark gap.

19. A method of operating a spark plug, the spark plug comprises:
    a first center wire assembly;
    a second center wire assembly;
    an insulator having a first axial bore for at least partially accommodating the first center wire assembly and a second axial bore for at least partially accommodating the second center wire assembly;
    a shell having an axial bore for at least partially accommodating the insulator;
    a first sparking area provided with a prechamber spark gap; and
    a second sparking area provided with a main chamber spark gap;
    the method comprises the steps of:
    sending a first high voltage ignition pulse to the first center wire assembly so that the prechamber spark gap is fired in response to a first set of engine operating conditions; and
    sending a second high voltage ignition pulse to the second center wire assembly so that the main chamber spark gap is fired in response to a second set of engine operating conditions that are different from the first set of operating conditions.

20. The method of claim 19, wherein the first set of engine operating conditions include high engine speeds or high load conditions, and the second set of engine operating conditions include low engine speeds or low load or start up conditions.

* * * * *